United States Patent [19]

Wheeler et al.

[11] Patent Number: 4,476,576

[45] Date of Patent: Oct. 9, 1984

[54] VLF COMMUNICATION SYSTEM

[75] Inventors: Myron S. Wheeler, Baltimore; Glenn R. Beach, Columbia, both of Md.

[73] Assignee: Westinghouse Electric Corp., Pittsburgh, Pa.

[21] Appl. No.: 429,359

[22] Filed: Sep. 30, 1982

[51] Int. Cl.[3] .......................... H04B 1/03; H01Q 1/22

[52] U.S. Cl. ...................................... 455/97; 343/706; 343/848; 343/849; 455/129

[58] Field of Search ........................ 455/39, 40, 97, 98, 455/129, 127; 343/706, 719, 848, 849

[56] References Cited

U.S. PATENT DOCUMENTS 1,296,687 3/1919 Nichols .............................. 343/706
1,303,730 5/1919 Rogers ............................... 343/719
1,650,461 11/1927 Nilson ................................ 343/706
3,253,279 5/1966 Tanner ............................... 343/849
3,701,159 10/1972 Simonds ............................. 343/849
3,727,229 4/1973 Clinger et al. ...................... 343/706

FOREIGN PATENT DOCUMENTS 1504303 3/1978 United Kingdom ................. 455/97

*Primary Examiner*—Marc E. Bookbinder
*Attorney, Agent, or Firm*—D. Schron

[57] ABSTRACT

A VLF communication system which utilizes the electrically conducting portions of an electromechanical cable connected to a deployed aerostat and acting as its tether so as to additionally serve as the VLF antenna.

7 Claims, 10 Drawing Figures

VLF COMMUNICATION SYSTEM

STATEMENT OF GOVERNMENT INTEREST

The Government has rights in this invention pursuant to Contract No. N00039-80-C-0379 awarded by the Department of the Navy.

BACKGROUND OF THE INVENTION

1. Field of the Invention:

The invention in general relates to communication systems, and particularly to those which require extremely long antennas due to the low frequencies utilized.

2. Description of the Prior Art:

Many communication systems operating at high frequencies utilize a physically large tower as a monopole antenna or to support a monopole antenna. Ideally, the antenna is a quarter wavelength in height (for some midband frequency) for improved efficiency and increased bandwidth.

At very low frequencies, however, a quarter wavelength tower is both physically and economically impractical. For example, a VLF system operating at 61 kHz would need an antenna over 4,000 feet high. A VLF system operating at 17 kHz would dictate a quarter wavelength antenna of close to 15,000 feet. Accordingly, in VLF systems, the monopole antenna arrangement is less than the ideal height. Use of top loading can effectively increase the height of an antenna by a small percentage beyond the actual physical height of the antenna and support tower which in most installations is less than 1,500 feet thus, such antennas are known to be electrically short antennas.

In such systems a counterpoise, that is, an arrangement of radial wires is utilized to effectively shield the earth from the radio frequency (rf) field above it to reduce the magnitude of the current in the earth in the vicinity of the antenna. Very often in a permanent installation, hundreds of wires are utilized as the shield and the wires are electrically connected to a grounding device in the form of a ground rod which penetrates the earth. For a high frequency system, the skin depth in the earth of average conductivity is about 17 feet whereas at very low frequency the skin depth at for example 21 kHz is 114 feet.

For a permanent installation, a construction of a high tower for the antenna as well as the grounding of the hundreds of wires of the counterpoise with a grounding rod over 100 feet long represents no major difficulty. A need exists however for a portable, rapidly deployable VLF communication system which can be set up in the field in a minimal amount of time. A typical permanent installation cannot meet these criteria.

SUMMARY OF THE INVENTION

The VLF communication system in accordance with the present invention includes an inflatable, lighter than air, dirigible-like aerostat preferably having a nose portion and stabilizing fins adjacent to its tail.

When deployed, the aerostat is tethered from a winch means by an electromechanical cable and means are provided for connecting a VLF transmitter to the electrically conducting portion of the cable which then acts as the antenna for the transmitter. The cable is preferably of the type which includes a plurality of electrical conductors, as well as a grounding sheath, all of which are electrically connected to a plurality of slip rings on the winch arrangement. A polyphase transformer is included and has its primary windings connected to a source of electrical energy and its secondary windings connected to the slip rings. Means are provided for electrically connecting the transmitter to the slip rings, in one embodiment or to the transformer secondaries in another embodiment whereby the transmitter is then electrically connected to the plurality of electrical conductors as well as the grounding sheath of the cable.

A counterpoise arrangement is provided and includes a plurality of radially extending wires electrically joined and grounded in the vicinity of their outer ends.

The winch may be mounted on a metal platform which is adequately insulated from a carrier vehicle and which is electrically driven by the transmitter during operation of the VLF communication system.

DESCRIPTION OF THE PREFERRED EMBODIMENT

Figure 1:
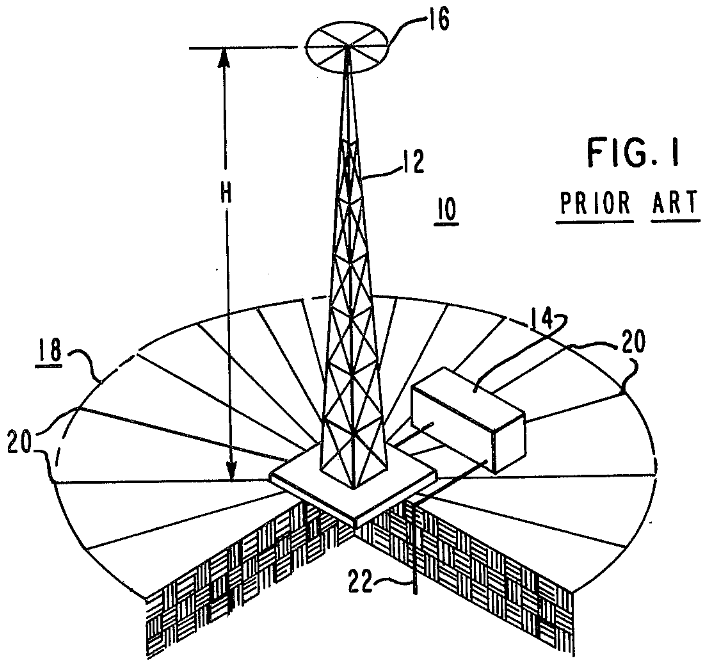
FIG. 1 PRIOR ART
FIG. 1 illustrates a typical prior art permanent VLF system.

Referring now to FIG. 1, a typical VLF installation 10 includes a large supporting tower 12 which may form, or which may support, a VLF antenna driven by transmitter 14.

The physical height H of the antenna may be effectively increased somewhat by use of a well-known top loading arrangement 16; however, the ideal ratio $$H/\lambda = 0.25$$

is far from attained and accordingly radiation efficiency suffers.

The installation generally includes a counterpoise 18 made up of a plurality of radial wires 20 lying on or embedded just below the surface of the earth. A typical installation may have a radial wire every 3° and these wires, as well as the transmitter, are grounded at the base of the antenna by means of a grounding rod 22 whose length is approximately equal to one skin depth in the earth to collect all the radial currents returning to the antenna. For a center frequency of 21 kHz, a typical rod length may be between 100 and 200 feet, depending upon the earth's conductivity at the installation site.

Figure 2:
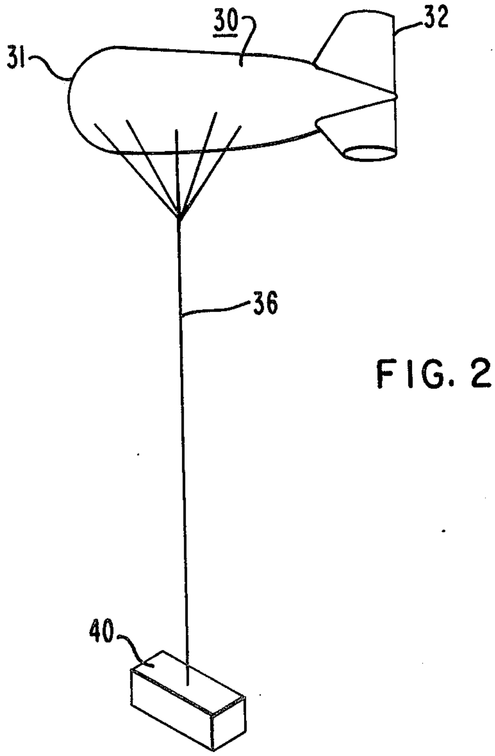
FIG. 2 illustrates the deployment of an aerostat, in accordance with the present invention.

In accordance with the present invention, a portable, rapidly deployable VLF system is provided by making use of a tethered aerostat as illustrated in FIG. 2. Aerostat 30 is an inflatable, lighter than air structure containing helium and has a dirigible-like configuration including a nose portion 31 and stabilizing fins 32 at the tail. Use of these aerostats as high altitude platforms for communication equipment has been known for many years. In such use, electronic payloads have been suspended from a stabilized platform (not shown) below the aerostat so as to enable point-to-point and omnidirectional communication over extensive geographic areas.

The aerostat 30 is reeled in and out and is maintained on-station at an altitude which may be measured in terms of miles by means of a tether 36 which is of the electromechanical variety. For use in the present invention, the aerostat need not carry any electronic payload and accordingly the electrically conducting portion of the electromechanical cable forming the tether 36 is utilized to conduct power to maintain certain "housekeeping" functions such as operation of beacon lights, and fans for maintaining aerodynamic shape. The tether maintains the aerostat above the VLF ground station 40 until the particular communication task is completed and after which the tether is reeled in to bring the aerostat back down to earth.

Figure 3:
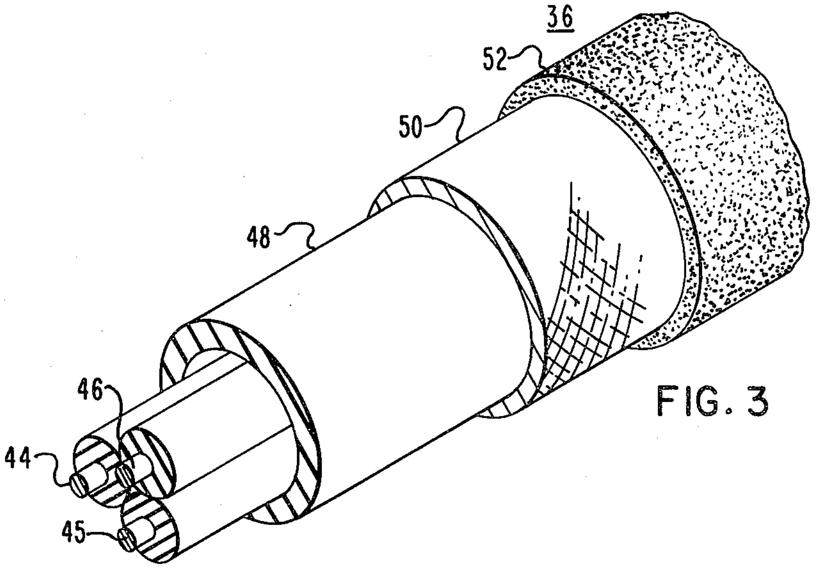
FIG. 3 is a view, with portions stripped away, of the tether used for the aerostat of FIG. 2.

A preferred type of electromechanical cable to be used as the tether is illustrated in FIG. 3. The tether cable includes three inner conductors 44, 45 and 46, each embedded in an insulator such as polyolefin thermoplastic polymer and surrounded by a strength member 48 such as contrahelically wound filaments of Kevlar, a trademark of the Du Pont Corporation. A copper or aluminum braid shield 50 surrounds the strength member 48 and it in turn is surrounded by a protective jacket 52 which is preferably of a conductive or semiconductive polymer material.

During VLF transmissions, ground power to the aerostat is interrupted and the three inner conductors 44, 45 and 46 are electrically connected to the copper braid shield to constitute the VLF antenna.

Figure 4:
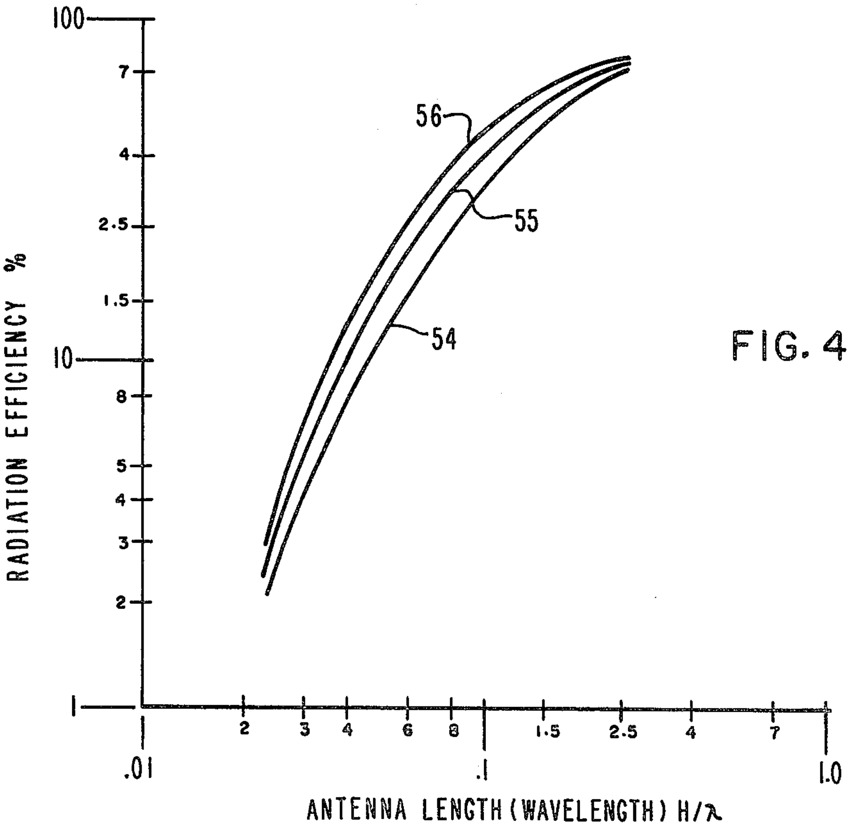
FIG. 4 shows curves relating the radiation efficiency of an antenna to the antenna length.

As was stated, a grounded counterpoise arrangement is utilized to increase radiation efficiency which increases as the total amount of wire utilized in the counterpoise increases. A typical relationship is illustrated by the curves of FIG. 4 wherein antenna length in wavelengths ($H/\lambda$) is plotted on the horizontal logarithmic scale and radiation efficiency is plotted on the vertical logarithmic scale. Curve 54 represents an extreme wherein no wire is utilized, that is, no counterpoise, while the other extreme is represented by curve 56 which illustrates the relationship utilizing 3.2 wavelengths of wire in the counterpoise. At the lowest used frequency of, for example, 17 kHz, 3.2 $\lambda$ represents over 35 miles of wire, a requirement which is incompatible with the objectives of a transportable system with minimized size and installation time of the counterpoise. For a given antenna length, earth conductivity and frequency, there is an optimum number of radials making up the specified wire length used in the counterpoise. For example, many short radials or few longer radials may be used to achieve 0.02 wavelengths of wire in the counterpoise, but there is an intermediate length of radial and number of wires minimizing the loss for the given wire usage. This optimum usage is assumed in constructing FIG. 4.

A reasonable choice of total amount of counterpoise wire is 0.02 $\lambda$ represented by curve 55 midway between the two extremes of curves 54 and 56. At the lowest frequency of 17 kHz, 0.02 $\lambda$ represents approximately 1,157 feet of wire used optimally in eight radials as illustrated in the counterpoise arrangement 60 of FIG. 5.

Figure 5:
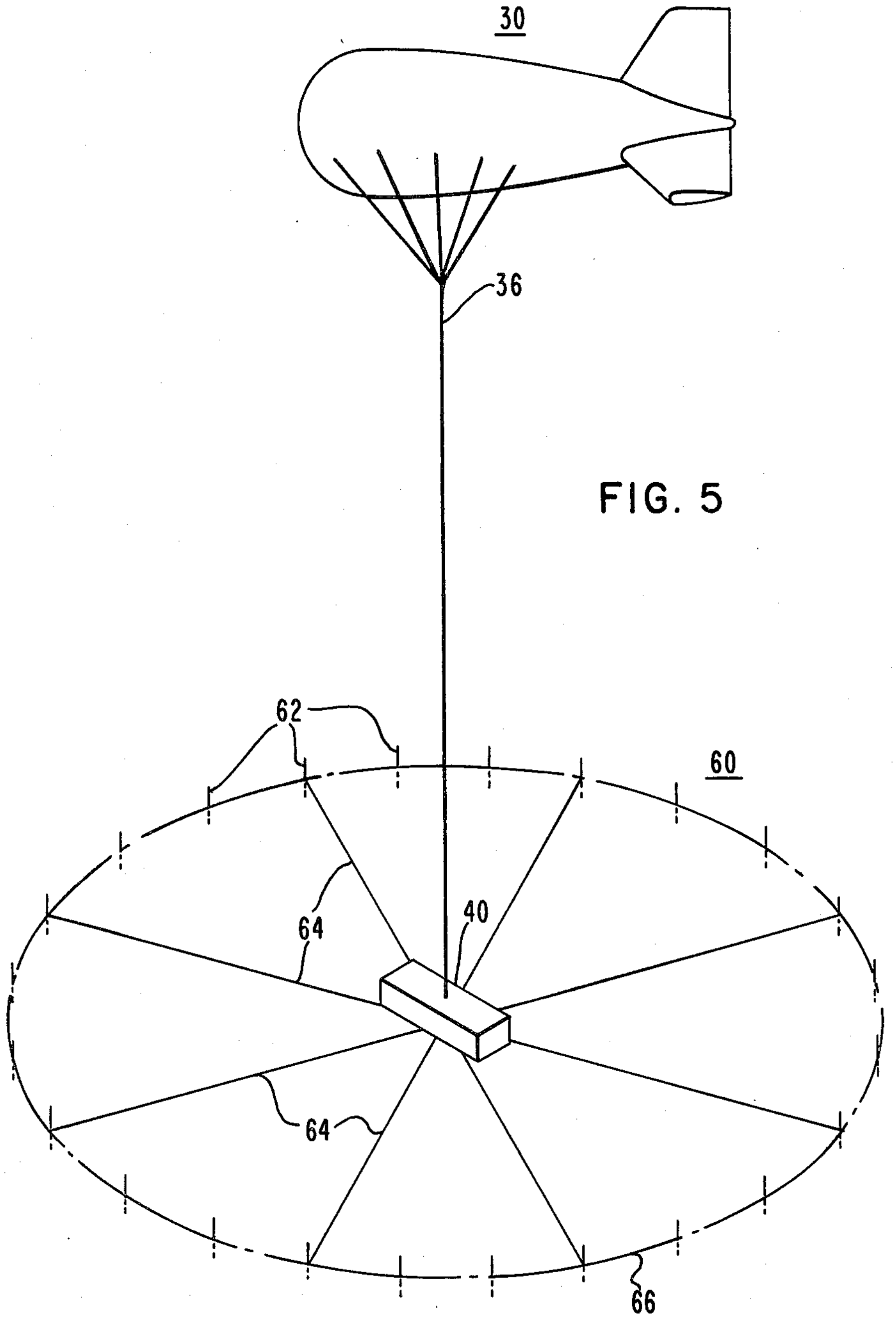
FIG. 5 illustrates the aerostat of FIG. 2 deployed over a counterpoise arrangement.

In place of a single grounding rod driven to a great depth into the earth, the present invention utilizes a plurality of relatively short grounding rods driven into the ground in a generally circular arrangement and provide for the same AC performance. Thus, as illustrated in FIG. 5, grounding rods 62 may be driven into the ground for a distance of 2 to 3 feet for example, and may then be electrically tied in with the radials 64 of the counterpoise 60. A wire 66 may electrically join all of the grounding rods 62 together or alternatively a grounding rod at the end of a radial may be electrically joined with only its two nearest neighbors. In a practical system by way of example, a grounding arrangement which would provide for a 4 ohm DC ground would require 25 rods spaced at 40 feet, set in a circle of radius of 160 feet, and driven 2 feet into the conducting earth. Radials 64 and wires 66 may be comprised of No. 8 AWG copper wire available in 500-foot spools weighing a manageable 62 pounds each.

Figure 6:
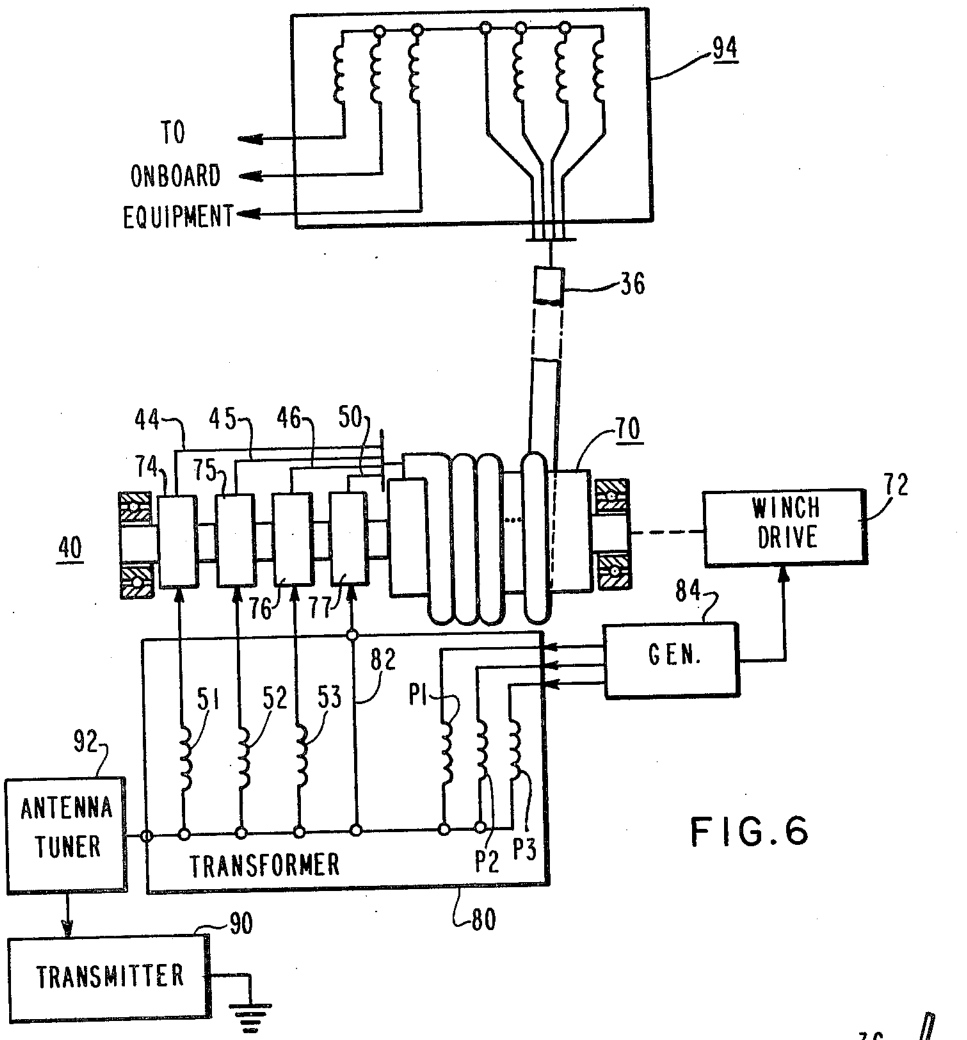
FIG. 6 is a schematic diagram illustrating the electrical connections of one embodiment of the present invention and FIG. 6A illustrates the apparatus on a carrier vehicle.

The ground station 40, illustrated in more detail in FIG. 6, includes a winch 70 on which the tether 36 is wound and which is controlled by a winch drive and generator system 72 and 84.

The inner conductors 44–46 of tether 36 are connected to respective slip rings 74–76 which receive power from respective secondary windings S1–S3 of transformer 80, the ground 82 of which is connected to slip ring 77 in electrical connection with copper braid shield 50 of the tether. Three phase power is supplied to primary windings P1–P3 of the transformer by means of generator 84 which also supplies power to the winch drive 72.

Figure 6A:
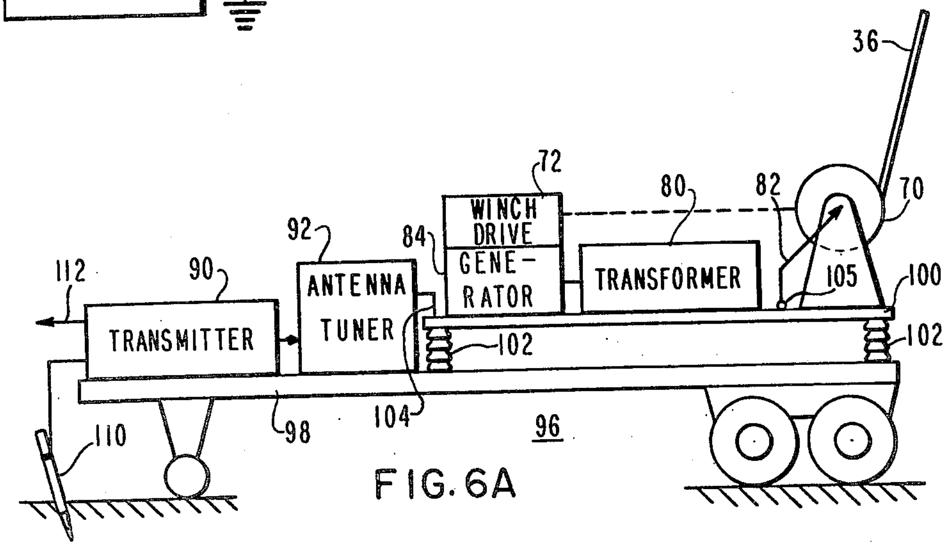

Transmitter means are provided for VLF communication and include a transmitter 90 connected to transformer ground 82 through an antenna turner 92 which may be provided to tune the transmitter to the capacitive antenna (when less than a quarter wavelength). Accordingly, during operation when the aerostat is deployed, three phase power is supplied up the tether to an aerostatcarried transformer 94 which reduces the transmitter voltage for use by on-board equipment. When the VLF transmitter 90 is operational, the three conductors and the copper braided shield of the tether are in parallel, thus tending to reduce the $I^2R$ losses in the antenna when transmitting. The output voltage of the transmitter may be as high as 100 kv if, for example, the antenna length is substantially less than a quarter wave length and accordingly the transformer ground, as well as the transformer case, generator, winch drive and winch will assume this high voltage during VLF operation and must be adequately insulated such as illustrated in FIG. 6A. As the antenna length approaches $\lambda/4$ the voltage becomes considerably less, this being one of the advantages of using the long tether antenna.

In FIG. 6A the equipment of FIG. 6 is seen to be located on a carrier vehicle such as a trailer 96, the bed 98 of which carries the transmitter and antenna tuner 90 and 92 as well as an electrically conducting platform 100 suitably insulated from bed 98 by means of standoff insulators 102. Conducting platform 100 in turn, being provided with the necessary insulation, carries the winch and winch drive 70 and 72 as well as the transformer 80 and generator 84. For VLF communication, the output of antenna tuner 92 is electrically connected to the conducting platform 100 such as at point 104, as is tether shield lead 82 at point 105. Necessary tie downs for the trailer 96 are not illustrated.

A dual grounding arrangement is provided for transmitter 90, one ground being by virtue of electrical connection to copper stake 110 embedded in the earth and with the other being by virtue of connection of lead 112 to the center of the counterpoise arrangement illustrated in FIG. 5.

Figure 7:
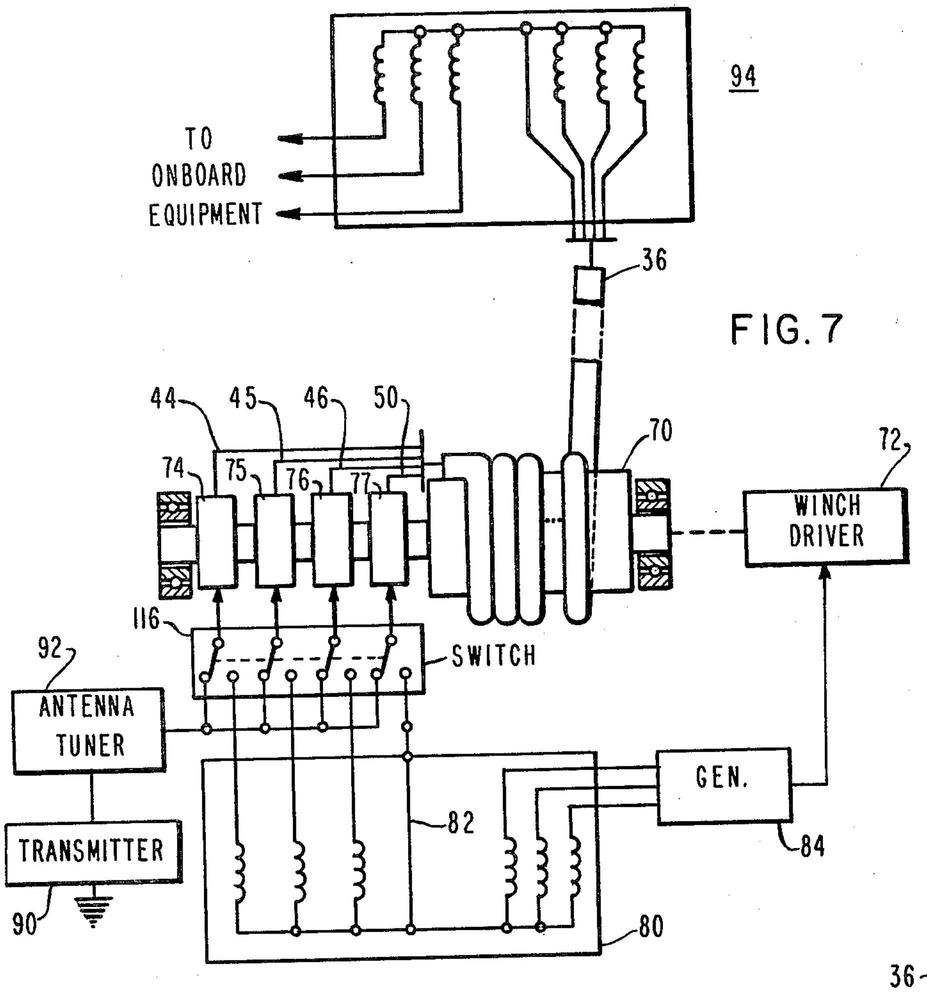
FIG. 7 is a schematic diagram illustrating the electrical connections of another embodiment of the present invention and FIG. 7A illustrates the apparatus on a carrier vehicle.

FIG. 7 illustrates a variation of FIG. 6 wherein only the winch need be insulated for the transmitter high voltage. The arrangement of FIG. 7 is similar to that of FIG. 6 but additionally includes a four pole switch 116 which is operative to connect the conductors of tether 36 to either the output of transformer 80 or transmitter 90. FIG. 7 illustrates the situation where transmitter 90 is connected for transmission such that the transformer 80, generator 84, and winch drive 72 are not connected to the very high transmitter voltage. With such arrangement, the power necessary for maintaining housekeeping functions on board the aerostat may be provided by aerostat-carried batteries or other power sources. After the necessary transmission, the contacts of switch 16 may be moved to their other position for the normal supply of three phase power to the aerostat.

Figure 7A:
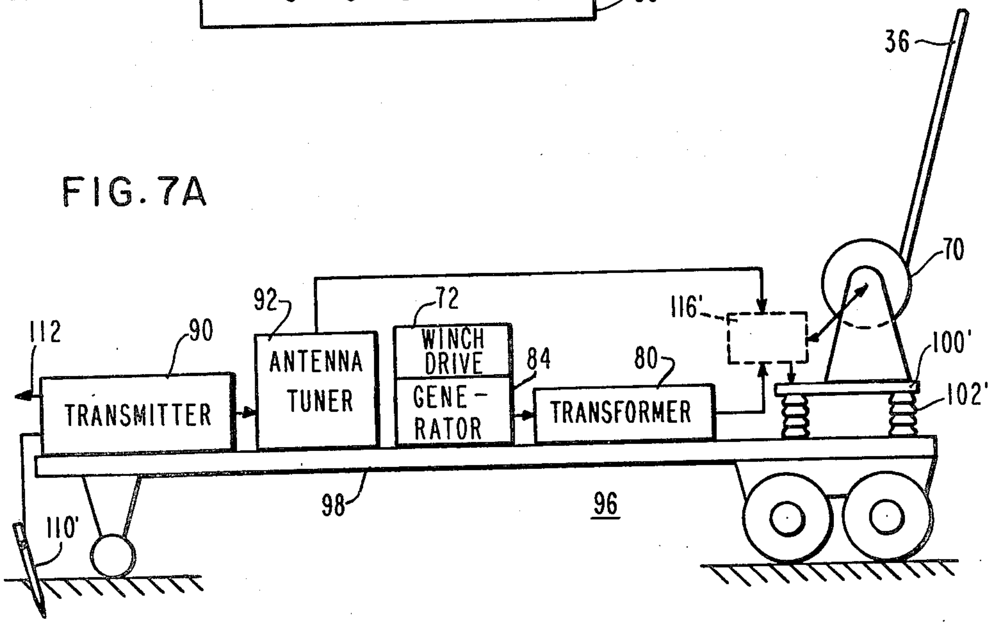

FIG. 7A illustrates the carrier of the apparatus illustrated in FIG. 7. It is seen that the electrically conducting platform 100' supported on standoff insulators 102' may be much smaller than its counterpart 100 in FIG. 6A since it need only insulate the winch 72. Four pole switch 116 is not illustrated in FIG. 7A, however, the electrical connections (and disconnections) provided thereby during VLF transmission are indicated by the dotted box 116'.

Since the antenna conductors are wound around a drum in a coil-like configuration, there may be an inherent inductive reactance which would cause detuning problems. If the preferred tether as illustrated in FIG. 3 is utilized, the inductance detuning problem is minimized due to the conductive nature of the protective jacket 52 of the tether which effectively shorts the multiple turns on the winch whereby rf current may flow from turn to turn without going around the winch drum.

Figure 8:
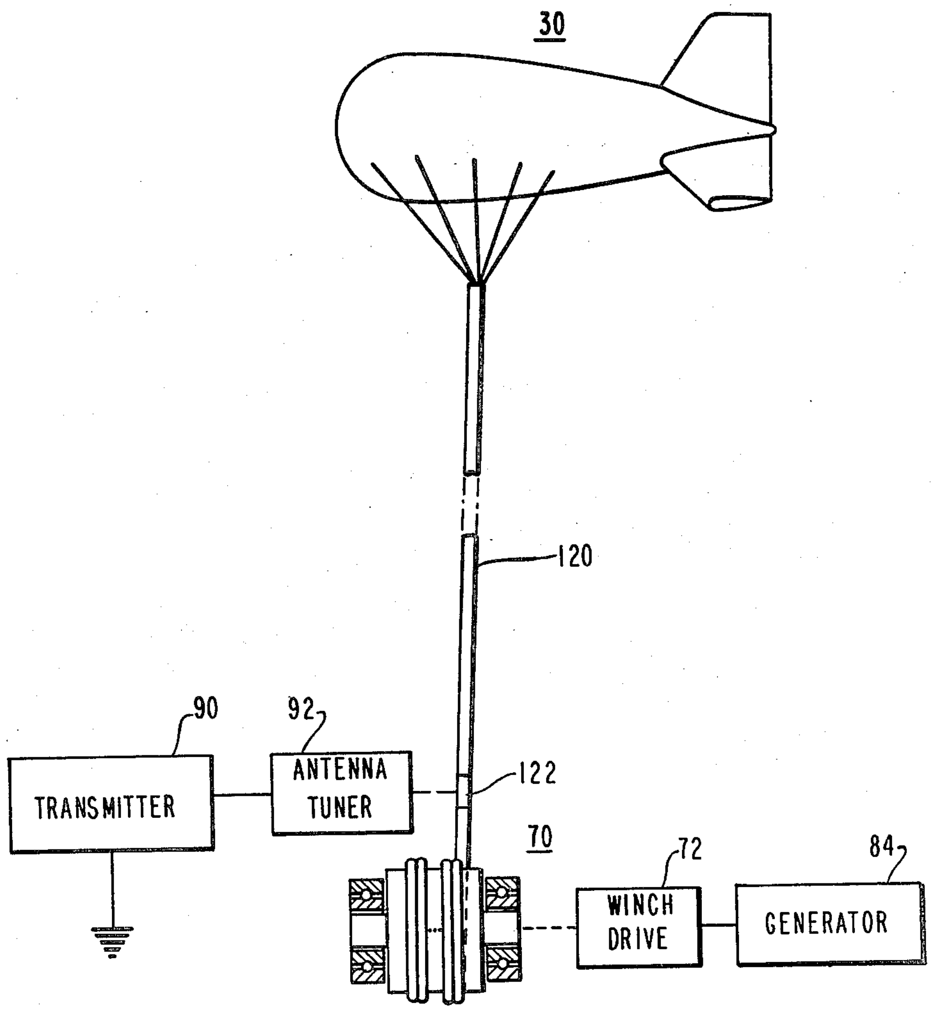
FIG. 8 illustrates another embodiment of the invention.

For relatively short periods of deployment, the necessary on-board power for the aerostat may be provided by an on-board power source in which case the requirement for powering up the tether cable is eliminated. In such instance, an arrangement such as illustrated in FIG. 8 may be utilized for VLF communication. The tether 120 is an electromechanical cable which may be comprised of a protected Kevlar strength member around which is an electrically conducting copper braid, suitably protected by an outer jacket. If the aerostat 30 is to be deployed each time to a fixed known altitude, then electrical connection may be made to the copper braid at the appropriate location, as indicated by the connection 122, above which point the copper braid extends the full length of the tether and below which point the cable is devoid of copper braid. The output of the antenna tuner 92 may then be directly applied to the connection 122.

In those instances where the aerostat is to be deployed at a plurality of different altitudes, then a plurality of such connections 122 may be provided for making connection with the copper braid which would be periodically interrupted along the length of the tether so as to provide for insulating portions. Electrical connections such as by jumpers would then be made from connection 122 to connection 122 as the aerostat is being deployed and before the application of the transmitter voltage.

Accordingly, there has been described a VLF communication system which uses the tether to employ an aerostat for the VLF system. The apparatus is portable and the aerostat can be inflated on site and deployed to heights far greater than those attainable with a permanent tower installation so as to achieve greater radiation efficiency as well as greater bandwidth. The efficiency and bandwidth is also increased with the use of a counterpoise grounded at points radially disposed from the VLF transmitter by means of relatively short grounding rods. The apparatus may be readily transported to a particular site, set up in a minimal amount of time, to accomplish a VLF communication task.

We claim:

1. A VLF communication system comprising:

(A) a VLF transmitter;

(B) an aerostat;

(C) winch means;

(D) an electromechanical cable connected between said winch means and said aerostat, when deployed;

(E) said electromechanical cable including a plurality of electrically conducting members;

(F) a slip ring arrangement including a plurality of slip rings in electrical contact with a respective one of said electrically conducting members;

(G) a transformer having primary and secondary windings with said secondary being in electrical contact with said slip rings;

(H) means for supplying said primary of said transformer with electrical energy;

(I) means connecting said transmitter to said slip rings so as to be in electrical contact with said electrically conducting members.

2. Apparatus according to claim 1 wherein:

(A) said transmitter is electrically connected to said secondary of said transformer.

3. Apparatus according to claim 2 wherein:

(A) said electromechanical cable includes three electrical conductors and a conducting shield;

(B) said slip rings are respectively connected to said conductors and shield;

(C) said transformer includes three primary windings and three secondary windings;

(D) said transformer includes a transformer ground connection;

(E) said three secondary windings being in respective electrical contact with said slip rings which are in contact with said three conductors;

(F) said ground connection being in electrical contact with the slip ring which is in contact with said shield; and wherein (G) said transmitter is electrically connected to said secondary windings.

4. Apparatus according to claim 1 which includes:

(A) switch means connected to both said transmitter and transformer and operable to selectively connect one or the other to said slip rings.

5. Apparatus according to claim 1 which includes:

(A) a counterpoise having a plurality of wires radially extending on the ground at the location of said transmitter;

(B) a plurality of grounding rods positioned in the conducting earth in a generally circular array at the distant ends of said radially extending wires;

(C) means electrically joining said grounding rods with said radially extending wires.

6. Apparatus according to claim 5 wherein:

(A) there are eight wires in said plurality of radially extending wires.

7. Apparatus according to claim 1 wherein:

(A) said electromechanical cable includes an outer protective jacket which is electrically conductive so as to minimize inductive effects when wound upon said winch means.

* * * * *